United States Patent [19]

Woten

[11] 4,411,390

[45] Oct. 25, 1983

[54] INSULATION BLOWING AND SPRAYING APPARATUS

[76] Inventor: Homer G. Woten, 912 Perrin Ave., NW., Winter Haven, Fla. 33880

[21] Appl. No.: 251,710

[22] Filed: Apr. 6, 1981

[51] Int. Cl.³ .............................................. B02C 17/16
[52] U.S. Cl. ................................. 241/98; 241/101 A; 241/159; 406/64
[58] Field of Search .............. 241/152 A, 159, 101 A, 241/235, 200, 98; 406/64, 65

[56] References Cited

U.S. PATENT DOCUMENTS

| | | |
|---|---|---|
| 810,989 | 1/1906 | Steinert . |
| 2,180,379 | 11/1939 | Whitfield ............................... 302/35 |
| 2,684,206 | 7/1954 | Zettel ............................... 241/235 X |
| 3,085,834 | 4/1963 | Woten et al. ........................... 302/49 |
| 3,135,561 | 6/1964 | Kempthorne ........................... 302/49 |
| 3,346,197 | 10/1967 | Sagar .................................... 241/200 |
| 3,529,870 | 7/1968 | Woten ..................................... 302/49 |
| 3,552,800 | 1/1971 | Truetzschler ........................... 302/40 |
| 3,724,908 | 4/1973 | Burrough et al. ...................... 302/37 |
| 4,111,493 | 9/1978 | Sperber ................................... 302/42 |

FOREIGN PATENT DOCUMENTS 144532  3/1931  Switzerland ......................... 241/157

Primary Examiner—Mark Rosenbaum
Assistant Examiner—Timothy V. Eley
Attorney, Agent, or Firm—Lalos, Leeds, Keegan, Lett & Marsh

[57] ABSTRACT

An apparatus for producing particulate material from compact masses of materials such as that used for insulation and then pneumatically dispensing the material in a uniform flow and with a preselected and consistent density. The apparatus includes a hopper for receiving the compact masses, an outlet positioned in the bottom of the hopper and a shredding zone located within the upper portion of the hopper for shredding large compact masses into smaller masses or nodules. An auger is positioned below the shredding zone and above the outlet for moving the material along the hopper. Below the auger is a tearing and separating zone that receives the material from the outlet and operates to tear and separate any of the nodules of the material into particulate material. The particulate material is then received and dispensed by a pneumatic transport means. The transport means includes a rotating air lock having an inlet at one end and an end plate at the other or exhaust end of the air lock. An exhaust metering port is formed in the end plate with a graduated opening enlarged towards the direction of rotation of the air lock to permit the particulate material to be progressively discharged.

29 Claims, 5 Drawing Figures

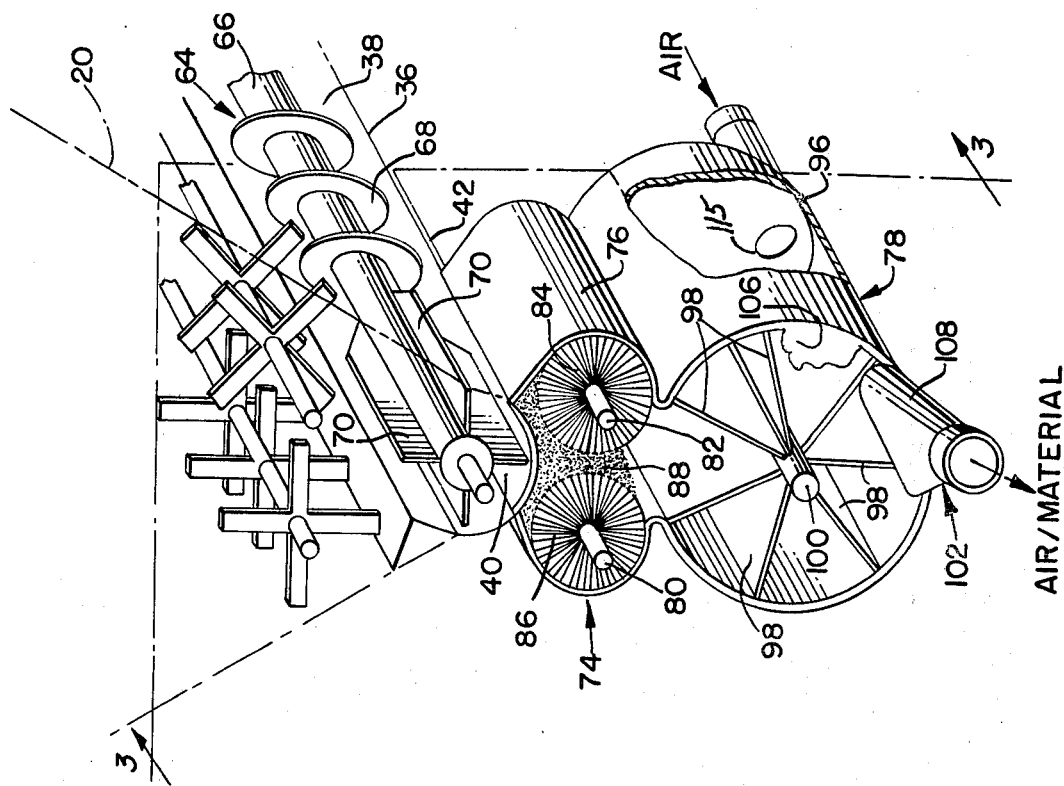
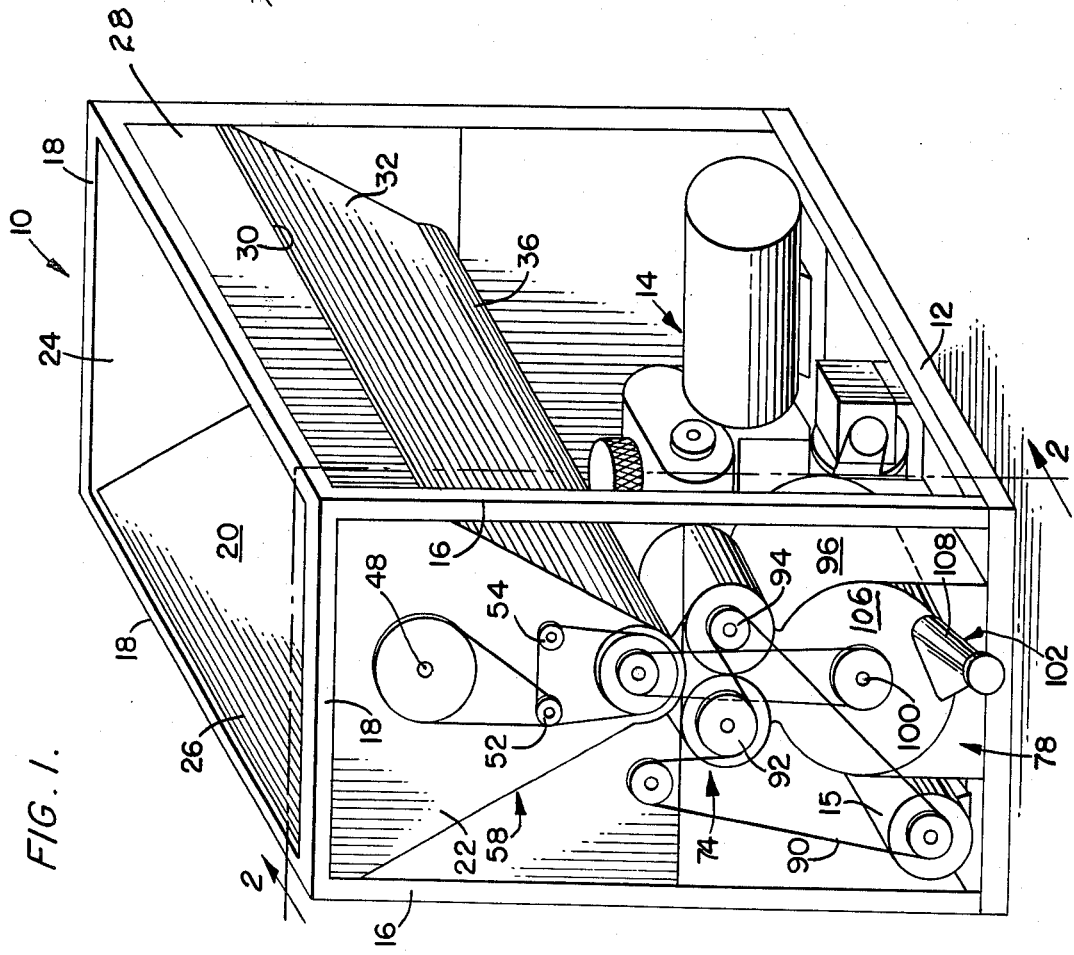

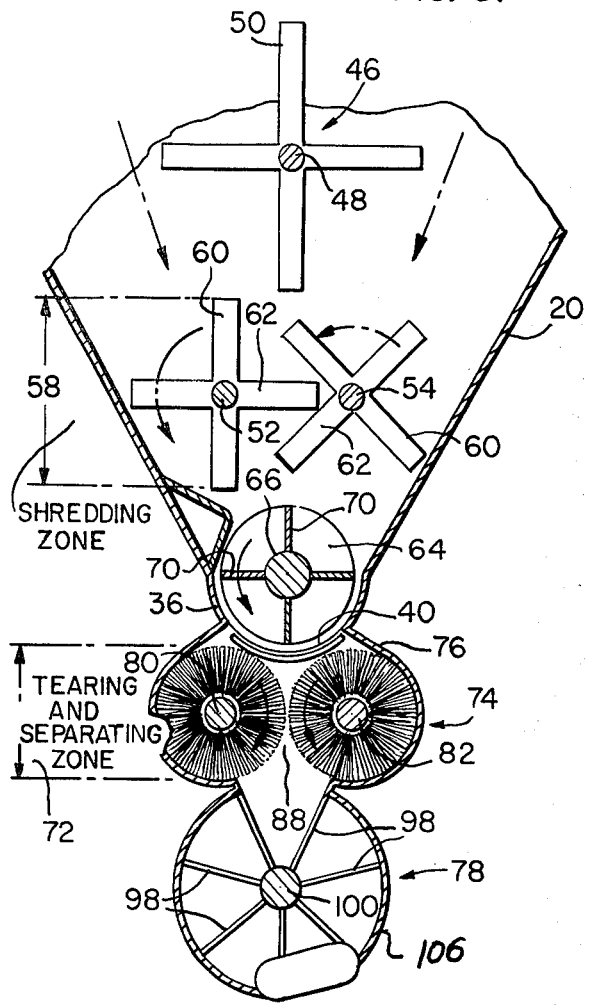
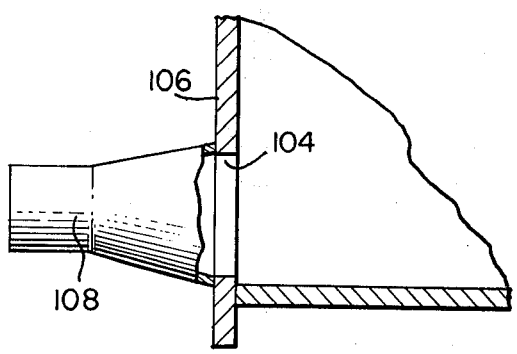
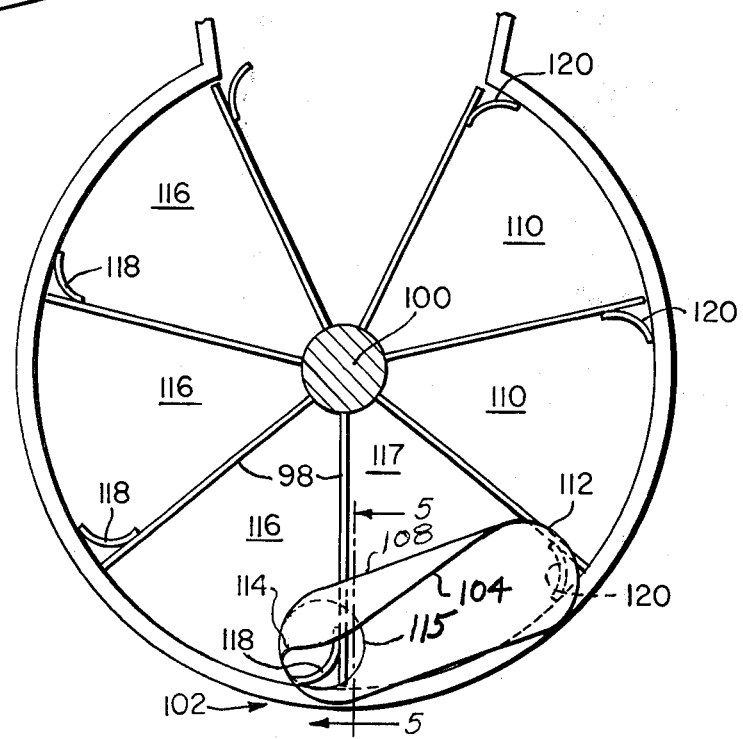

INSULATION BLOWING AND SPRAYING APPARATUS

BACKGROUND OF THE INVENTION

This invention relates to apparatus for producing particulate material from compact masses of material. More particularly the present invention is concerned with an apparatus for producing particulate material from compressed or compacted masses of material such as insulation materials and then pneumatically blowing or spraying such materials.

In general the types of insulation materials with which the present invention is concerned includes loose insulating material that is generally but not exclusively fibers such as granulated rock wool, granulated mineral fiber wool, glass fiber materials, cellulose fibers, expanded mica, etc. This insulation material may be in particulate form and may be either blown dry or sprayed through a nozzle with liquid added to form an insulating and sealing coating on any surface. The insulation material has been blown on conventional walls and ceilings of places of habitation or working areas but also may be sprayed in mine shafts, tunnels and the like.

The insulating material used in conventional insulation spraying and blowing machines is in a relatively loose condition but it is usually packed under high compression in bags or sacks for shipment to the user. Upon being opened these bags or sacks usually yield compressed masses of the insulation material that renders the insulation material difficult to use in conventional apparatus that require feeding through an air hose to the area to be insulated. Because of the very low density of the material there is usually formed under the compaction in the bags or sacks large masses that are perhaps up to a foot or more in diameter and cannot be easily separated into the individual particulate material. Even smaller masses in the form of nodules that may be up to several inches in diameter also are unsuitably large to be fed through an air hose or to be effective in providing the desired insulation. These large masses as well as the nodules must be separated into particulate materials, although they may be to some extent intertwined with each other and not be discrete. The fibrous material forming the majority of the insulating materials is typically the most difficult to handle unless it is kept in a semifluidized state which desirably relies upon the material being particulate. The term "particulate" must be understood to include not only particles but also one or more intertwined or overlapping fibers and for convenience the term "particulate material" will therefore include materials formed as particles as well as such fibers.

These problems have been addressed previously and in fact the present inventor holds U.S. Pat. No. 3,085,834 jointly with another and U.S. Pat. No. 3,529,870 as the sole patentee. Each of these patents relates to insulation blowing machines and each has achieved a measure of success in the art. However, the control of the density of the material and the consistency of flow of the product are important and desirable aspects for successful use but are not achieved to the fullest extent by either of these machines or in others known to be in use in the art.

In Woten U.S. Pat. No. 3,529,870 granulation occurred immediately prior to receiving the particulate material in an air lock but in this arrangement uniformity and consistency in the density and flow of the particulate material was prevented. Further in this Woten patent, nodules of insulating material often were not broken up into the particulate material desired and then passed through the granulator into the air lock for conveying to the air hose. When this occurs, experience has indicated substantial difficulty in conveying the insulating material through the air lock and out to the air hose. The problem, however, is not limited to the difficulties encountered with the insulation blowing machine. Even if the nodules of insulation material are passed through the air hose, their higher density inherently produces a lower bulk volume for filling an area to be insulated resulting not only in poorer thermal insulation, when such is desired, but also necessitating the use of more insulating material to fill the remaining void.

None of these or other insulation blowing machines permitted attainment of an essentially nodule or compact mass free particulate material. In each instance the prior art apparatus did not have the fine controls or adjustment desired to produce the required uniformity in density and flow of the particulate material.

OBJECTS OF THE INVENTION

The present invention has as a principal object the provision of apparatus for producing particulate material from compact masses of such material and pneumatically convey and dispense such materials.

A more specific object of the present invention is to provide an apparatus for producing particulate material from compact masses and to produce a smooth flow of the material having a consistent density.

Another object of the present invention is the provision of an apparatus having a shredding zone located in the upper portion of the hopper for receiving the compact masses and producing smaller masses or nodules.

This invention has as a further object the provision of an apparatus for producing particulate material and having a tearing and separating zone for receiving the material and permit tearing and separating of the particulate material from nodules of the material to produce the uniform density desired.

Still a further object of the present invention is the provision of apparatus for producing particulate material utilizing a pneumatic transport means with a rotating air lock and providing an end plate in the air lock with a graduated opening in order that the particulate material is progressively discharged from within the air lock to maintain a uniform flow of material.

These and other objects of the present invention will become apparent from a careful reading of the following description including the preferred embodiment along with the accompanying drawings all forming part of the disclosure of this invention.

SUMMARY OF THE INVENTION

An apparatus for producing preselected and consistent density of particulate material from compact masses of insulation materials and then pneumatically dispensing the material in a uniform flow. The apparatus includes a hopper for receiving the compact masses, an outlet positioned in the bottom of the hopper and a shredding zone located within the upper portion of the hopper for shredding large compact masses into smaller masses or nodules. A shredding means including a plurality of rotating shafts and having a plurality of radially extending bars extending through the hopper and have orbits that mutually overlap. An auger is positioned below the shredding means and above the outlet for moving the material along the hopper. Below the auger is a tearing and separating zone that receives the material from the outlet and operates to tear and separate any of the nodules of the material into particulate material. The tearing and separating zone includes means having a plurality of counterrotating brush elements through which the material passes to be torn and separated. The particulate material is then received and dispensed by a pneumatic transport means. The transport means includes a rotating air lock having an inlet at one end and an end plate at the other or exhaust end of the air lock. An exhaust metering port is formed in the end plate with a graduated opening enlarged towards the direction of rotation of the air lock to permit the particulate material to be progressively discharged.

THE DRAWINGS

FIG. 1 is a perspective view of the apparatus for producing particulate material from compact masses of material and illustrating generally the concepts of the present invention.

FIG. 2 is a side elevation cross-sectional view taken along lines 2—2 of FIG. 1 and illustrating the internal components of the present invention.

FIG. 3 is an end elevation sectional view of the apparatus of the present invention taken along lines 3—3 of FIG. 2.

FIG. 4 is an end elevation view, partly broken away, towards the air lock feeder and the exhaust metering port.

FIG. 5 is a sectional view along lines 5—5 of FIG. 4.

DESCRIPTION OF THE PREFERRED EMBODIMENT

As may be best seen in FIG. 1 the present invention is shown generally at 10 and is the complete apparatus for producing particulate material from compact masses and the capability of pneumatically dispensing the materials with a uniform and preselected density. As shown, the apparatus may be sized for different purposes but generally it is to be expected that the apparatus will be mobile and permit transportation to various job locations where insulation is to be applied.

The apparatus includes a base 12 to support the drive mechanisms 14 and 15 securely attached to the base 12. Upright frame members 16 are positioned to rise from the corners of the base 12 and along with cross members 18 provide support for the hopper 20.

The hopper 20 is provided with vertical end walls 22 and 24 that depend from the cross members 18. The hopper is provided with downwardly extending side walls 26 and 28 secured to the cross members 18. Side wall 28 only extends part way down the hopper to a point at 30 where it converges to form lower inclined wall 32. At the bottom of the hopper 20 is arcuate trough 36 formed from side wall 26 and lower wall 32. The trough extends the length of the hopper and forms a bottom 38.

The arcuate trough 36 is cut away at one end of the hopper to form a material outlet 40. The outlet is of preselected length and width and sufficiently large to accommodate the highest volume flow of material that would be desired. The outlet 40 is made adjustable however to control the flow rate of the material through the outlet by means of a sliding gate 42 mounted for movement across the outlet lengthwise of the trough. To permit ease of adjustability, and to indicate the position of the sliding gate, manual indicator and adjustor (not shown) is provided for use by the operator. It is then a simple matter to move the adjustor longitudinally of the trough to open or close the outlet 40.

As best shown in FIGS. 2 and 3 the contents of the hopper 20 are kept in motion by means of agitator 46 which is positioned high in the hopper and extends longitudinally to rotate about shaft 48. The agitator is provided with a plurality of rods 50 secured to the shaft 48 in any suitable manner. The rods are positioned to be in pairs at right angles to each other as best shown in FIG. 3. The pairs of rods 50 are spaced along the shaft 48 in any convenient interval.

Positioned below the agitator 46 and mounted on shafts 52 and 54 that are preferably counterrotating or rotating in the same direction as shown, by the arrows in FIG. 3 is a shredding means positioned within the shredding zone 58 as illustrated by the vertical line between the arrows. Means may be provided for varying the speed of rotation of the shafts 52 and 54. This initial shredding is important to achieve the uniformity in density that is produced by the present invention.

Each of the counterrotating shafts 52 and 54 is provided with pairs of bars 60 and 62. The bars 60 and 62 are suitably secured to their respective shafts 52 and 54. The shredding bars 60 and 62 are coupled in pairs and spaced at various intervals along the respective shafts 52 and 54 as best shown in FIG. 2. As best shown in FIG. 3, the shafts 52 and 54 are closely adjacent such that the orbit of the shredding bars on shaft 52 substantially overlaps with the orbit of the shredding bars on shaft 54. While there is no actual physical contact between the shredding bars on one shaft with the shredding bars on the other shaft it can be seen that the orbits of the shredding bars on the adjacent shafts substantially overlap and intermesh.

Positioned immediately below the shredding bars 60 and 62 to receive the material passing through the shredding zone is a conveying means of any type such as an auger 64 mounted for rotation within the trough 36. The auger is provided with a shaft 66 extending through the end walls 22 and 24 of the hopper. The auger screw 68 extends along the auger shaft 66 from the end wall 24 up to approximately the beginning of the outlet 40 as best shown in FIG. 2. From that point through the full longitudinal extent of the outlet 40 the auger shaft 66 is provided with radial paddles 70. As is evident from FIG. 2, the shredding bars 60 and 62 deposit the shredded material in a downward direction to and along the length of the auger 64 with generally no lateral movement of the shredded material relative to the auger 64. The direction of rotation of the auger shaft and the auger screw spiral are constructed such that material dropping from the shredding zone into the auger and falling to the bottom of the hopper will be moved towards the outlet 40 . As is also evident from FIG. 2, any excess material not passing through the outlet 40 generally does not move up from the auger 64 to the shredding bars 60 and 62. The radial paddles 70 positioned at right angles to adjacent paddles help to move the material through the outlet 40.

As the material falls through the outlet 40 it enters a tearing and separating zone 72 in which is included the tearing and separating means 74. The tearing and separating means 74 is retained in the housing 76 which bridges the outlet 40 and is connected to the air lock feeder 78 positioned below. Within the housing 76 and mounted for rotation are a pair of shafts 80 and 82 that preferably counterrotate. Secured to each of the shafts 80 and 82 is a plurality of brushes 84 and 86. It is preferred that the brushes 84 and 86 extend the full length of the shafts 80 and 82 and rotate freely within the housing 76. It is also preferable that the orbit of the brushes on the adjacent shafts 80 and 82 be such that the spacing 88 between the brushes be relatively small preferably, less than a quarter of an inch. The shafts 80 and 82 may be rotated at different speeds such as by endless belt 90 which wraps around ordinary but different sized pulleys 92 and 94. Due to the different rotational speeds of the brushes 84 and 86 material passing through the spacing 88 is torn apart. This is particularly evident in the event that nodules of insulating material drop from the outlet into the tearing and separating zone and it is here that the tips of the brushes tear away the individual fibers leaving the particulate material to pass through the tearing and separating zone into the air lock 78. The density of the product entering the air lock is thus made more uniform.

The air lock feeder 78 includes a housing 96 and a plurality of rotary vanes 98 secured to a shaft 100. Material falling from the tearing and shredding zone drops into the cavity between adjacent vanes and is rotated around the housing between the vanes until the cavity is in alignment with the pneumatic transport means 102 as best shown in FIGS. 2, 4 and 5.

The pneumatic transport includes a unique exhaust metering port 104 positioned within the end plate 106 as best shown in FIG. 5. The end plate 106 as shown substantially broken away in FIG. 2 to reveal the internal elements of the feeder 78. The exhaust metering port is housed by an exhaust hood 108 that is shown to be in an oblong shape but may be in fact any shape that would encompass the shape of the exhaust metering port 104. The inlet and inlet hood are of any shape and size and may be positioned on the opposite side of the air lock feeder.

As can be best seen from FIG. 4, the exhaust metering port extends substantially across the arcuate extent of the adjacent vanes 98 and is offset substantially toward the direction of the empty vane cavities 110. The exhaust metering port as shown has a trailing edge 112 positioned in the direction of the rotation of the rotary vanes and at the opposite end of the exhaust metering port is a tapered leading edge 114. The inlet port 115 is not necessarily offset in the same manner as the exhaust port 104 but preferably has at least a portion thereof aligned with the leading edge 114 of the exhaust port 104 in order to permit the next filled cavity 116 to begin to be emptied while cavity 117 being emptied receives the major force of the pneumatic transport means 102.

The purpose of the offset of the exhaust metering port towards the empty vane cavities 110 rather than the filled vane cavities 116 is that the filled vane cavities tend to leak pressure about the seals 118 more than there would be any leakage about seals 120 due to the air pressure entering the inlet. Thus, with the use of the offset exhaust metering port, more seals 118 in the filled cavities 116 are more often in contact with the inside of the housing 96 than the lesser number of seals 120 which tend to be closed and not leak prone. It has been found that such construction tends to retain pressure within the air lock.

As will be appreciated as the filled vanes 116 approach the leading edge 114 of the exhaust metering port 104 there is a progressive transport of the particulate material within the filled vane and as the vane moves further in its rotational path more of the exhaust metering port will be exposed thus progressively applying greater air flow to blow the particulate material from the filled vane cavity while losing minimal pressure from the seals 118 still in contact with the inside of the housing 96. Uniformity of flow of the material passing through the exhaust port 104 results.

It should be manifest that all the objects of the present invention have been achieved by the present invention as disclosed and therefore the scope of the invention should be limited solely by the following claims.

I claim:

1. Apparatus for producing particulate material from compact masses of material such as insulation materials and pneumatically dispensing such materials comprising, a hopper for containing said compact masses, an outlet positioned towards the bottom of said hopper, a shredding zone located within an upper portion of said hopper for receiving said materials and shredding any large compact masses of said material into smaller masses or nodules, shredding means within said zone and including a plurality of rotating elements for receiving and shredding said compact masses, conveying means positioned below said shredding means and above said outlet for moving said material along said hopper, a tearing and separating zone positioned below said outlet and receiving said material passing through said outlet to tear and separate any nodules of said material into particulate material, said tearing and separating zone including a plurality of rotating brush elements through which said material passes to be torn and separated, and pneumatic transport means positioned below said tearing and separating zone to receive and dispense said particulate material.

2. The apparatus of claim 1 including, said shredding means and said plurality of rotating elements including a plurality of counterrotating shafts extending through said hopper, each said shaft being provided with a plurality of radially extending bars.

3. The apparatus of claim 2 including, means for rotating the shafts of said shredding means at varying speeds to vary the shredding of said masses.

4. The apparatus of claim 2 including, said shafts being sufficiently proximate to permit the orbit of said bars to overlap so as to separate said masses of compact material passing through said bars.

5. The apparatus of claim 1 wherein said plurality of rotating brush elements are provided on adjacent counterrotating shafts wherein the brush elements extend radially and confront brush elements on an adjacent shaft.

6. The apparatus of claim 5 including, means for rotating said brush elements at different speeds.

7. The apparatus of claim 6 including, said brush elements being in close proximity to brush elements on an adjacent shaft whereby to tear away particulate material from any small mass or nodule of material passing between adjacent brush elements.

8. The apparatus of claim 1 including,
said shredding means and said plurality of rotating elements including a plurality of counterrotating shafts extending through said hopper, each said shaft being provided with a plurality of radially extending bars,
said shafts being sufficiently proximate to permit the orbit of said bars to overlap so as to separate said masses of compact material passing through said bars, and
wherein said plurality of rotating brush elements are provided on adjacent counterrotating shafts wherein the brush elements extend radially and confront brush elements on an adjacent shaft.

9. The apparatus of claim 1, 2, 4, 5, 8, 3, 6, or 7 including,
said transport means having a rotating air lock means,
an air inlet at one end of said air lock means,
an end plate at the other end of said air lock means,
an exhaust metering port in said end plate, and
said exhaust metering port having a graduated opening enlarged toward the direction of rotation of said air lock means whereby the particulate material is progressively discharged from within said air lock means.

10. The apparatus of claim 9 including,
said exhaust metering port having a leading edge and an opposite trailing edge,
said exhaust metering port being enlarged towards the direction of rotation of said air lock means from said leading edge to said trailing edge, and
said exhaust metering port being progressively larger at said trailing edge in the direction of rotation and tapered to close at said leading edge.

11. The apparatus of claim 10 including,
said rotating air lock means including a plurality of vane cavities,
said vane cavities being filled with said particulate material as it passes down from said tearing and separating means and being emptied of said particulate material as said filled vane cavities are rotated, by said air lock means, in front of said exhaust metering port, and
said exhaust metering port being offset toward the direction of said empty vane cavities whereby to minimize any loss in pressure through said filled vane cavities.

12. The apparatus of claim 1 including,
agitator means positioned within said hopper and above said shredding means and said conveying means being an auger.

13. The apparatus of claim 12 including,
said agitator means comprising a rotating shaft having radially extending elongated elements.

14. The apparatus of claim 1 including,
said shredding means depositing the shredded material in a downward direction to said conveying means with generally no lateral movement of the shredded material relative to said conveying means.

15. The apparatus of claim 14 including,
said conveying means and said shredding means being adapted and positioned so that any excess shredded material not passing through said outlet generally does not move up from said conveying means to said shredding means.

16. The apparatus of claim 14 including,
said shredding means depositing the shredded material on said conveying means along the length of said conveying means including above said outlet.

17. The apparatus of claim 15 including,
said shredding means depositing the shredded material on said conveying means along the length of said conveying means including above said outlet.

18. The apparatus of claim 1 including,
said conveying means and said shredding means being adapted and positioned so that any excess shredded material not passing through said outlet generally does not move up from said conveying means to said shredding means.

19. The apparatus of claim 1 including,
said shredding means depositing the shredded material on said conveying means along the length of said conveying means including above said outlet.

20. The apparatus of claim 1 including,
said pneumatic transport means including at least one airlock having a horizontally-disposed longitudinal axis,
said plurality of rotating brush elements being provided on adjacent parallel counterrotating shafts wherein the brush elements extend radially and confront brush elements on an adjacent shaft, and
said counterrotating shafts being disposed generally parallel to said airlock.

21. The apparatus of claim 20 including,
the outer tips of the brush elements on one said counterrotating shaft defining a first orbit and the outer tips of the brush elements in the other said counterrotating shaft defining a second orbit, and
said first orbit and second orbit being nonintersecting and being spaced a small distance.

22. The apparatus of claim 21 including,
said first orbit being cylindrical and said second orbit being cylindrical, and
said first orbit and said second orbit defining a narrow space therebetween positioned directly above said airlock.

23. The apparatus of claim 1 including,
said nodules being generally the size of a walnut.

24. The apparatus of claim 1 including,
said tearing and separating means tearing away individual fibers from the nodules.

25. Apparatus for producing particulate material from compact masses of material such as insulation materials and pneumatically dispensing such materials comprising,
a hopper for containing said compact masses,
an outlet positioned towards the bottom of said hopper,
a shredding zone located within an upper portion of said hopper for receiving said materials,
shredding means in said zone for shredding any large compact masses of said material into smaller masses or nodules
conveying means positioned below said shredding means and above said outlet for moving said material along said hopper,
a tearing and separating zone positioned below said outlet and receiving said material passing through said outlet to tear and separate any nodules of said material into particulate material,
tearing and separating means within the latter zone including rotating elements through which said material passes to be torn and separated, pneumatic transport means positioned below said tearing and separating zone to receive and dispense said particulate material,
said transport means including a rotating air lock means,
an air inlet at one end of said air lock means,
an end plate at the other end of said air lock means,
an exhaust metering port in said end plate,
said exhaust metering port having a graduated opening enlarged toward the direction of rotation of said air lock means whereby the particulate material is progressively discharged from within said air lock means.

26. The apparatus of claim 25 including,
said air lock means having a plurality of radially disposed rotor vanes forming a plurality of vane cavities.

27. The apparatus of claim 26 including,
said exhaust metering port extending across at least one vane cavity.

28. The apparatus of claim 25 including,
said exhaust metering port having a leading edge and an opposite trailing edge,
said exhaust metering port being enlarged towards the direction of rotation of said air lock means from said leading edge to said trailing edge, and
said exhaust metering port being progressively larger at said trailing edge in the direction of rotation and tapered to close at said leading edge.

29. The apparatus of claim 28 including,
said rotating air lock means including a plurality of vane cavities,
said vane cavities being filled with said particulate material as it passes down from said tearing and separating means and being emptied of said particulate material as said filled vane cavities are rotated, by said air lock means, in front of said exhaust metering port, and
said exhaust metering port being offset toward the direction of said empty vane cavities whereby to minimize any loss in pressure through said filled vane cavities.

* * * * *